United States Patent
Tan

[11] Patent Number: 5,993,969
[45] Date of Patent: *Nov. 30, 1999

[54] CARBON FILM ELECTRODES FOR SUPER CAPACITOR APPLICATIONS

[75] Inventor: Ming X. Tan, Livermore, Calif.

[73] Assignee: Sandia Corporation, Livermore, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/791,319

[22] Filed: Jan. 30, 1997

[51] Int. Cl.$^6$ .................................................. B32B 9/00
[52] U.S. Cl. .......................... 428/408; 361/502; 427/80; 427/122; 427/228
[58] Field of Search ............................. 427/80, 122, 228, 427/79; 428/408; 361/502, 508, 516, 528, 532

[56] References Cited

U.S. PATENT DOCUMENTS

| | | | |
|---|---|---|---|
| 5,071,820 | 12/1991 | Quinn et al. | 502/434 |
| 5,079,674 | 1/1992 | Malaspina | 361/502 |
| 5,172,307 | 12/1992 | Tabuchi et al. | 361/502 |
| 5,260,855 | 11/1993 | Kaschmitter et al. | 361/502 |
| 5,426,561 | 6/1995 | Yen et al. | 361/502 |
| 5,557,497 | 9/1996 | Ivanov et al. | 361/502 |
| 5,641,702 | 6/1997 | Imai et al. | 438/396 |

OTHER PUBLICATIONS

Wessling, R. ed. Polyvinylidene Chloride, Chapter 10: "Carbonization of Saran"; pp. 159–172; Chapter 11: "Technology"; pp. 173–182 (1977) No month data!.

Gregory, J.B. ed. Third Conference on Industrial Carbons and Graphite, Apr. 14–17, 1970, Adams, L.B. et al, "Preparation, Structure and Properties of Saran Carbon Fibres and Powders", pp. 478–482 (1971).

*Primary Examiner*—Roy V. King
*Attorney, Agent, or Firm*—Timothy Evans; Kurt Olsen

[57] ABSTRACT

A microporous carbon film for use as electrodes in energy strorage devices is disclosed, which is made by the process comprising the steps of: (1) heating a polymer film material consisting essentially of a copolymer of polyvinylidene chloride and polyvinyl chloride in an inert atmosphere to form a carbon film; and (2) activating said carbon film to form said microporous carbon film having a density between about 0.7 g/cm$^2$ and 1 g/cm$^2$ and a gravimetric capacitance of about between 120 F/g and 315 F/g.

5 Claims, 1 Drawing Sheet

CARBON FILM ELECTRODES FOR SUPER CAPACITOR APPLICATIONS

STATEMENT OF GOVERNMENT INTEREST

This invention was made with Government support under contract no. DE-AC04-94AL85000 awarded by the U.S. Department of Energy to Sandia Corporation. The Government has certain rights in the invention.

CROSS REFERENCE TO RELATED APPLICATIONS

Not Applicable.

BACKGROUND OF THE INVENTION

This invention pertains generally to the preparation of electrodes for very high capacitance electrolytic double layer capacitors (super capacitors) and more particularly, to a method for preparation of high surface area carbon film electrodes for super capacitors.

Double layer capacitors are well known in the art and consist of an electrochemical cell, or combination of cells, including two electrodes, an electrolyte and a containment means. The electrolyte must provide good ionic conductivity but negligible electronic conductivity and can be an aqueous solution; a nonaqueous inorganic solution, that can comprise such liquids as thionyl chloride or sulfuryl chloride as solvents; or an organic solution that can comprise, for example, propylene carbonate, ethylene carbonate, acetonitrile, tetrahydrofuran, dimethylsulfoxide as solvents. The electrodes are polarizable and therefore, within a certain range of potentials, do not allow the exchange of electrons between the solute ions in the electrolyte and the electrode and generally consist of carbon or one or more oxides of ruthenium, tantalum, rhodium, iridium, cobalt, nickel, molybdenum, tungsten, or vanadium deposited onto a metal backing. As potential is applied between the electrodes of a double layer capacitor, ions from the electrolyte are adsorbed onto the electrodes causing an electrical double layer to be developed between the electrodes and the electrolyte into which they are immersed. This electrical double layer can be regarded as equivalent to a parallel plate capacitor wherein the capacitance is directly related to the surface area of the electrodes.

Because the capacitance of super capacitors is significantly greater, per unit volume than the more conventional parallel plate capacitor, super capacitors have found application in home audio/video equipment and computers as power back-up. Moreover, with the potential for capacitances as high as 900 F for carbon electrodes, super capacitors are extremely attractive as energy storage devices for electrical energy, particularly for load leveling applications such as electrical vehicles.

Since the capacitance of super capacitors is directly related to the surface area of the electrode, the need for super capacitors with higher volumetric capacitances (greater than 200 F/cc) has provided the impetus for developing electrode materials with very high surface areas. Various materials have been studied for super capacitor electrodes and the best of these materials have volumetric capacitances between 100 and 300 F/cc. However, most of these materials use either high cost polymer films and/or are produced through complicated laboratory fabrication and activation processes that are difficult to put into industrial mass production. What is needed is a low cost, high performance material (volumetric capacitance exceeding 200 F/cc) material for electrodes for super capacitor applications that can be fabricated inexpensively and on an industrial scale.

SUMMARY OF THE INVENTION

The present invention is directed, in part, to a method for preparing a unique carbon film electrode material having a high surface area (greater than 1000 m$^2$/g) and a correspondingly high volumetric capacitance ($\approx$200 F/cc) that employs an inexpensive, commercially readily available organic polymer starting material.

According to the method disclosed here, a vinylidene chloride/vinyl chloride copolymer film can be first stabilized by a low temperature treatment in a restrained configuration, carbonized, and finally activated, to produce a flat sheet of carbon film electrode material having high surface area ($\approx$1000 m$^2$/g) suitable for super capacitor applications.

BRIEF DESCRIPTION OF THE DRAWINGS

The accompanying drawings, which are incorporated in and form part of the specification, illustrate the present invention and, together with the description, explain the invention. In the drawings like elements are referred to by like numbers.

DETAILED DESCRIPTION OF THE INVENTION

Figure 1A:
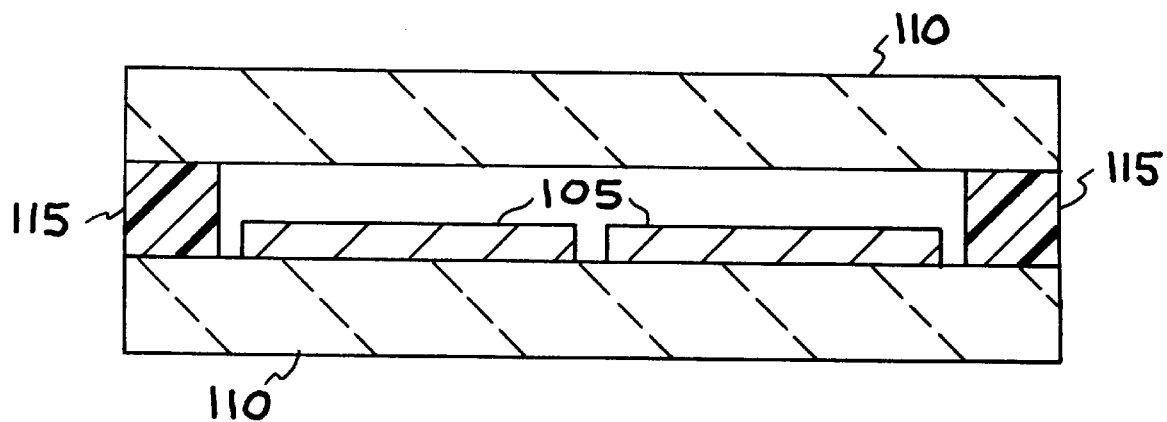
FIGS. 1(a) and 1(b) illustrate two modes of restraining a polymer film material.

The present invention provides a method for treating an organic polymer film material, preferably a vinylidene chloride/vinyl chloride copolymer (e.g., Saran) to produce a flat sheet of carbon film material having a high surface area ($\approx$1000 m$^2$/g), a density of between 0.7–1 g/cc, and a volumetric capcacitance $\approx$200 F/cc and thus, useful as an electrode material for super capacitor applications. The particular vinylidene chloride/vinyl chloride copolymer materials used are preferably materials containing 80% polyvinylidene chloride and 20% polyvinyl chloride copolymer.

The thermal degradation of polyvinylidene chloride to produce carbon is well known in the art and is generally considered to occur by a series of sequential steps, namely; primary dehydrochlorination to polychloroacetylene between 130–190° C., Diels-Alder condensation and aromatization between about 250–350° C., and finally complete dehydrochlorination to form a non-graphitizing carbon at about 600–700° C. It is further known in the art that the initial step in the thermal decomposition process, (primary dehydrochlorination) is a structure setting step and consequently, has an important bearing on the properties of the final carbon. The carbonization of polyvinyl chloride follows a different mechanism with dehydrochlorination occurring at temperatures higher than about 200° C. to form polyacetylene and eventually a graphitizable crystalline carbon at higher temperatures.

Carbons produced from the thermal decomposition of vinylidene chloride/vinyl chloride copolymer materials generally have a microporous structure with pore sizes in the range of 6–15 Å in diameter and a nominal surface area of $\approx$10 m$^2$/g which can be increased to greater than 1000 m$^2$/g by activation, i.e., treating the carbon with an oxidizing agent such as carbon dioxide, steam, or nitric acid at elevated temperatures, making them ideal materials for use as electrodes in super capacitors. However, the process of converting a vinylidene chloride/vinyl chloride copolymer film material, which can be ≈25 μm thick, to a carbon film can lead to distortions of the film which are particularly detrimental for the intended use as electrodes for super capacitor applications.

As set forth hereinabove, the thermal conversion of a vinylidene chloride/vinyl chloride copolymer material to carbon can be broadly divided into three stages: stabilization, or primary dehydrochlorination, which takes place at low temperature; condensation and aromatization at intermediate temperatures; and finally complete dehydrochlorination (carbonization) at elevated temperature, generally ≈700–900° C. for making electrode materials for super capacitors. The inventor has discovered that by restraining a vinylidene chloride/vinyl chloride copolymer film material, by disposing the film between graphite or ceramic plates separated by spacers having a thickness about twice the thickness of the vinylidene chloride/vinyl chloride copolymer film material at least during the structure setting first stage of thermal conversion (primary dehydrochlorination), problems associated with distortion of the film material can be avoided.

The present invention is directed, in part, to a method for making electrodes for super capacitors, comprising the steps of:

a) heating a vinylidene chloride/vinyl chloride copolymer film material disposed between spaced apart graphite or ceramic plates, wherein the plates are separated by spacers having a thickness about twice the thickness of the vinylidene chloride/vinyl chloride copolymer film, to a temperature of about 160° C. over a period of at least 14 hours;

b) heating the stabilized vinylidene chloride/vinyl chloride copolymer film, disposed as in step a), to a temperature of about 750° C. in an inert atmosphere for about one hour to form a carbon film; and c) activating the carbon film by heating in an oxidizing atmosphere to a temperature of between 750–850° C. for between about 1–6 hours.

Figure 1B:
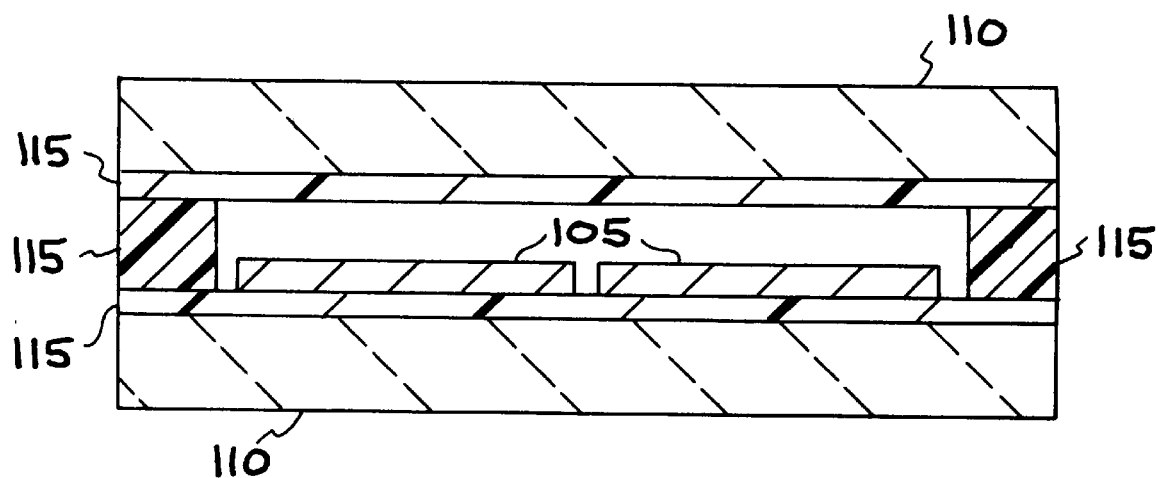

Referring now to FIG. 1, two modes of restraining a vinylidene chloride/vinyl chloride copolymer film material at least during the primary dehydrochlorination, or stabilization stage of the process are illustrated. In one mode (FIG. 1a) at least one piece of vinylidene chloride/vinyl chloride copolymer film material 105 is placed between two graphite or ceramic plates 110 having spacers 115 therebetween, wherein the thickness of the spacers is about twice the thickness of the vinylidene chloride/vinyl chloride copolymer film material. In a second mode (FIG. 1b) at least one piece of vinylidene chloride/vinyl chloride copolymer film material 105 is placed between two spaced apart graphite or ceramic plates 110, wherein a surface of each plate 110 facing the vinylidene chloride/vinyl chloride copolymer film material is coated with a flurorcarbon cloth or fluorocarbon-coated fabric 115, wherein the flurorcarbon is preferably Teflon. Spacers 115 having a thickness of about twice that of the vinylidene chloride/vinyl chloride copolymer film material 105 are placed between the plates 110.

The first step of heating, also referred to as stabilization, can be carried out in either an inert atmosphere or air, preferably by heating a vinylidene chloride/vinyl chloride copolymer film material, disposed between spaced apart graphite or ceramic plates, gradually from room temperature to about 155–160° C. over period of 6–8 hours. It is preferred to heat the film material to 100° C. at a heating rate of about 2–3° C./min, holding the film at 100° C. for about one hour, increasing the temperature to 130° C., holding the film at 130° C. for 2–3 hours, increasing the temperature to 150° C. and holding the film at that temperature for about 2 hours, and finally increasing the temperature to about 160° C. and holding for 14–28 hours.

The second step of heating converts the stabilized vinylidene chloride/vinyl chloride copolymer film material to a carbon film and comprises heating the stabilized film, disposed between two spaced apart graphite or ceramic plates, in an inert atmosphere to a temperature of at least 700° C., and preferably 740° C., at a rate of about 5° C./min, and maintaining that temperature for about one hour.

In order to provide a carbon film having properties desirable for use as an electrode material in super capacitors (i.e., high surface area) it is necessary to activate the carbon film. This can be done by heating the carbon film to elevated temperatures in an oxidizing atmosphere such as $CO_2$, steam or nitric acid. Preferably this can be done by heating the carbon film to temperatures of between 750–850° C. in an inert gas such as nitrogen and then replacing the nitrogen gas with $CO_2$ for about 2–3 hours. Table 1 shows the effect on the surface area of carbon films, produced by the thermal degradation of vinylidene chloride/vinyl chloride copolymer films, resulting from heating the carbon films in $CO_2$ for various temperatures and times.

TABLE 1

| Temperature (° C.) | Time (hr) | BET Surface Area (m²/g) |
| --- | --- | --- |
| 25 | — | 10 |
| 750 | 1 | 800 |
| 800 | 1 | 660–1020 |
| 800 | 2 | 920–980 |
| 800 | 6 | 820 |
| 850 | 1 | 861 |
| 850 | 2 | 892 |
| 850 | 3 | 1090 |

It can be seen that treating the carbon film by heating in $CO_2$ at a temperature of about 800° C. for about 2 hours or 850° C. for about 1–3 hours produces a significant increase in surface area compared with the untreated carbon film. Higher activation temperatures or longer times at temperature causes degradation of the carbon film.

The inventor has also discovered that by soaking the vinylidene chloride/vinyl chloride copolymer film materials in a variety of liquids such as water, methanol or acetone prior to the first heating step it is possible to increase the capacitance of the carbon films formed therefrom.

Table 2 shows the capacitance of carbon film electrodes produced by the thermal degradation of vinylidene chloride/vinyl chloride copolymer film materials as a function of activation time and temperature compared with an unactivated carbon film electrode having a volumetric capacity of about 10 F/cc.

TABLE 2

| Temperature (° C.) | Time (hr) | Capacitance (F/cc) |
| --- | --- | --- |
| 25 | — | 10 |
| 750 | 1 | 210 |
| 800 | 1 | 130–190 |
| 800 | 2 | 140–220 |
| 800 | 6 | 140–210 |
| 850 | 1 | 150 |
| 850 | 2 | 160 |
| 850 | 3 | 180–210 |

Maximum values of capacitance are observed at those activation conditions that produced maximum surface area values.

From the foregoing description and information, one skilled in the art can readily ascertain the essential characteristics of the present invention. The description and information presented above are intended to be illustrative of the present invention and are not to be construed as limitations or restrictions thereon, the invention being delineated in the following claims.

SEQUENCE LISTING

Not Applicable

I claim:

1. A microporous carbon film for use as electrodes in energy storage devices made by the process comprising the steps of:
    a) heating a polymer film consisting essentially of a copolymer of polyvinylidene chloride and polyvinyl chloride in air or in an inert atmosphere to a first heating temperature of about 160° C. and maintaining said first heating temperature for at least 14 hours to form a stabilized vinylidene chloride/vinyl chloride polymer film, said polymer film disposed between graphite or ceramic plates wherein the graphite or ceramic plates are separated by spacers, said spacers having a height about equal to twice the thickness of said polymer film;
    b) heating the stabilized vinylidene chloride/vinyl chloride polymer film, in an inert atmosphere, from said first heating temperature to a second heating temperature of about between 740° C. to 750° C., said step of heating to said second heating temperature further comprising increasing said temperature at a uniform rate of about 5° C. per minute and maintaining said second heating temperature for about one hour to form a carbon film; and
    c) activating said carbon film by introducing an oxidizing gas into, and substantially displacing, said inert atmosphere while maintaining said film temperature above about 750° C. to about 850° C. for between 1 and 6 hours thereby providing said microporous carbon film having a gravimetric electrical capacitance of between 120 F/g and 315 F/g.

2. The carbon film by the process of claim 1 wherein the first heating step further comprises the steps of:
    a) heating said polymer film material from room temperature to a temperature of about 100° C. at a rate of about between 2° C.–3° C. per minute and holding said polymer film material at about 100° C. for about one hour;
    b) increasing said temperature to about 130° C. and holding said polymer film material at 130° C. for between 2 to 3 hours;
    c) increasing said temperature to about 150° C. and holding the polymer film material at 150° C. for about 2 hours; and
    d) increasing said temperature to about 160° C. and holding the polymer film material at 160° C. for between 14 to 28 hours.

3. The carbons film by the process of claim 1 including the step of soaking said polymer film in a liquid selected from the group consisting of water, methanol, and acetone, said step of soaking preceding the first heating step.

4. The carbon film by the process of claim 1 wherein the oxidizing atmosphere is $CO_2$.

5. A microporous carbon film for use as electrodes in energy storage devices made by the process comprising the steps of:

heating a polymer film material consisting essentially of a copolymer of polyvinylidene chloride and polyvinyl chloride in an inert atmosphere to form a carbon film; and activating said carbon film to form said microporous carbon film having a density between about 0.7 $g/cm^2$ and 1 $g/cm^2$ and a gravimetric capacitance of about between 120 F/g and 315 F/g.

* * * * *